United States Patent [19]

Fromm et al.

[11] Patent Number: 5,436,533
[45] Date of Patent: Jul. 25, 1995

[54] METHOD TO OPERATE A HIGH-PRESSURE DISCHARGE LAMP SUITABLE FOR HORIZONTAL ARC POSITION

[75] Inventors: Dietrich Fromm, Warngau; Juergen Seehawer, Munich; Franz Bernitz, Unterhaching, all of Germany

[73] Assignee: Patent-Treuhand-Gesellschaft F. Elektrische Gluehlampen mbH, Munich, Germany

[21] Appl. No.: 247,074

[22] Filed: May 20, 1994

[30] Foreign Application Priority Data

May 25, 1993 [DE] Germany ............... 43 17 368.3

[51] Int. Cl.$^6$ .............. H05B 41/16; H01J 17/04
[52] U.S. Cl. ............... 315/246; 315/209 R; 313/631; 313/634
[58] Field of Search .......... 315/246, 209 R, DIG. 7, 315/219, 194, 287, , 326, 247, 248, 174, 224, 226; 313/623, 634, 641, 631

[56] References Cited

U.S. PATENT DOCUMENTS

| | | | |
|---|---|---|---|
| 4,170,746 | 10/1979 | Davenport | 315/246 |
| 4,527,097 | 7/1985 | Vander Heijden et al. | 315/246 |
| 4,983,889 | 1/1991 | Roberts | 325/246 |
| 5,121,034 | 6/1992 | Allen et al. | 315/246 |

FOREIGN PATENT DOCUMENTS

| | | |
|---|---|---|
| 0386990A3 | 9/1990 | European Pat. Off. . |
| 0399288A3 | 11/1990 | European Pat. Off. . |
| 0502273A3 | 9/1992 | European Pat. Off. . |
| 2034107 | 5/1980 | United Kingdom . |

OTHER PUBLICATIONS

"Techn.-wissensch. Abhandlg. der OSRAM-Gesellschaft" (Technological-scientific papers of the OSRAM company), vol. 12, pp. 394–407, publ. by Springer, article by Statnic Zum Hochfrequenzbetrieb von Halogen–Metalldampflampen kl. Leistung (High--frequency operation of metal vapor halide lamps of low power).

"Journal of the Illuminating Engineering Society", vol. 21, No. 1, Dec. 1992, New York, pp. 60–68, Rutan et al., Practical application of pulsed high pressure sodium lamp technology, p. 62, right col., line 26; p. 63, left col., line 23.

Primary Examiner—Ali Neyzari
Attorney, Agent, or Firm—Frishauf, Holtz, Goodman & Woodward

[57] ABSTRACT

To prevent bowing of the arc of a high-pressure discharge lamp operated horizontally, the lamp is supplied with alternating current of between 10 kHz and 100 kHz, in which the frequency and wave shape of the alternating current portions of the supply are so selected that standing radial acoustic resonances will be formed within the discharge medium or fill in the discharge vessel, which standing radially directed acoustic resonances suppress or counteract bending of the discharge arc due to convection phenomena.

9 Claims, 4 Drawing Sheets

METHOD TO OPERATE A HIGH-PRESSURE DISCHARGE LAMP SUITABLE FOR HORIZONTAL ARC POSITION

Reference to related U.S. application and patents, the disclosures of which are hereby incorporated by reference:
U.S. Pat. No. 4,170,746, Davenport
U.S. Pat. No. 5,121,034, Allen et al.
U.S. application Ser. No. 945,559, filed Sep. 25, 1978, Johnson (published as British Patent 2,034,107).

REFERENCE TO RELATED DISCLOSURES

"Technisch-wissenschaftliche Abhandlungen der OSRAM-Gesellschaft" ("Technological-scientific papers of the OSRAM company"), Vol. 12, pp. 394–407, published by Springer, article by Statnic "Zum Hochfrequenzbetrieb von Halogen-Metalldampflampen kleiner Leistung" ("High-frequency operation of metal vapor halide lamps of low power").

Book by C. H. Sturm/E. Klein: "Betriebsgeräte und Schaltungen für elektrische Lampen" ("Operating apparatus and circuits for electric lamps"), 6th edition, published by Siemens AG, pp. 212-215, chapter on halide metal vapor high-pressure lamps and operating apparatus.

FIELD OF THE INVENTION

The present invention relates to a method to operate a high-pressure discharge lamp, and more particularly to a metal halide high-pressure discharge lamp, which can be placed in horizontal position so that the arc extends horizontally without bending.

BACKGROUND

It is known to operate metal halide high-pressure discharge lamps with accessory or operating apparatus supplying alternating current at frequencies in the ultrasonic range.

U.S. Pat. No. 4,170,746, Davenport, describes a process in which high-pressure discharge lamps are operated with alternating current at a frequency in a narrow range between 20 and 50 kHz, and in which no acoustic resonance results in the discharge medium when the lamp is operated. Acoustic resonance, as used in this specification, means standing acoustic waves. Acoustic waves within the discharge medium are caused by periodic changes of the instantaneous electrical energy fed via the lamp electrodes into the discharge medium. The instantaneous electrical energy varies at twice the alternating frequency of voltage, or current, respectively, supplied to the lamp. Experimentally determined resonance-free frequency bands are described in that patent.

When discharge lamps are operated in horizontal position, that is, in such position that the arc extends horizontally, the arc has a tendency to bend due to convection. The fill components within the discharge vessel which are in gas form or vapor form are bent upwardly, so that the discharge arc will have an upwardly bowed form. If this lamp is coupled to an optical system, the bending of the discharge arc interferes with optically forming an image of the light source and does not yield a symmetrical illumination pattern. Bowing or bending of the discharge arc also increases the thermal loading of the upper wall of the discharge vessel, decreasing the lifetime of the lamp.

It has been proposed to counteract the tendency of the arc to bend, see U.S. application Ser. No. 945,559, of Sep. 25, 1978, Johnson, to which published British Patent 2,034,107 corresponds, to provide a vertically directed homogeneous magnetic field which applies a downwardly directed force on the plasma in the discharge arc. The magnetic field is generated by an electromagnet which surrounds the discharge vessel in half-moon or semi-circular shape. It is expensive and difficult to secure and hold such an electromagnet.

It has been found that when metal halide discharge lamps are operated with electronic accessory apparatus providing higher frequencies, that is, higher than 20 kHz, there are narrow frequency ranges specific to lamps in which the discharge arc does not bend or bow. U.S. Pat. No. 5,121,034, Allen et al, discloses narrow frequency ranges, which were experimentally determined for low power metal halide high-pressure discharge lamps suitable for use in automotive applications.

The frequency regions disclosed in this patent are so selected that acoustic resonances occur within the discharge medium which reduce or even eliminate the bending of the discharge arc by convection. According to this patent, the operating frequency should be modulated in order to broaden the frequency range in which stable lamp operation with a straight arc is possible and, in this manner, to compensate for tolerances which arise in manufacture of the discharge vessel and which occur in the accessory apparatus. Modulating the operating frequency substantially complicates the circuitry.

THE INVENTION

It is an object to provide a method to operate a high-pressure discharge lamp, for example a metal halide high-pressure discharge lamp, in horizontal position, which simply removes the bending or bowing of the discharge lamp due to convection.

Briefly, the lamp, suitable for horizontal operation, is fed with electrical energy having a frequency and wave form of the alternating current portion so selected that radial acoustic waves are generated within the discharge medium. The relationship between the frequency $F_V$ of the alternating current portion and the base frequency $F_R$ of the standing acoustic radial wave should, at least approximately, meet the relationship $$n \cdot 2 F_V = m \cdot F_R \qquad (1)$$

wherein m and n are integers, preferably of low value, for example 1, 2, 3.

Investigations carried out with numerous alternating current operated high-pressure discharge lamps, and especially with metal halide high-pressure discharge lamps, have determined that there is a close relationship between the bending of the discharge arc and the frequency, and the occurrence of acoustic radial resonance phenomena within the discharge arc so that when the lamp is in horizontal position, the bending of the arc can be compensated and eliminated.

The term "radial acoustic resonance" as used herein means acoustic resonance phenomena extending perpendicularly to a straight line between the electrodes of the lamp, that is, to the discharge path. This discharge path is defined by the heads of the electrodes. All lamps which have been investigated, when operated in accordance with the method of the present invention, were found to have a straight discharge arc if the frequency $F_V$ of the lamp operating current is so selected that, between that frequency and the base frequency $F_R$ of the radial acoustic resonance, the relationship of equation (1) above was met, at least approximately. The parameters m and n in this relationship represent integer numbers, preferably small numbers of 1, 2 and 3.

The relationship (1) must be so interpreted that a common multiple of twice the operating frequency $2F_V$ and of the base frequency $F_R$ must be available within the frequency spectrum of the alternating current supplied to the lamp in order to excite radial acoustic resonances. These radial acoustic resonances prevent the bending of the discharge arc due to convection.

DRAWINGS

FIG. 1b is a frequency analysis of the radial acoustic resonance in the discharge medium of the 70 W metal halide high-pressure discharge lamp of FIG. 1a;

DETAILED DESCRIPTION

Figure 1A:
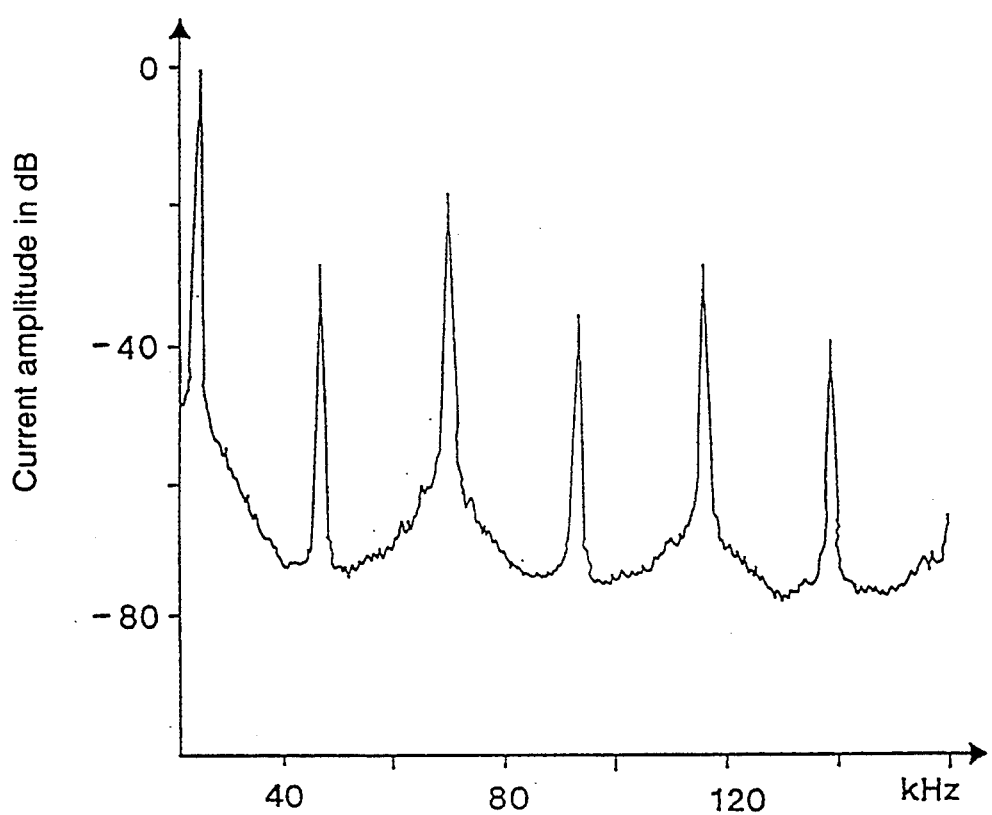
FIG. 1a is a frequency analysis of alternating current amplitude for a 70 W metal halide high-pressure discharge lamp.
Figure 1B:
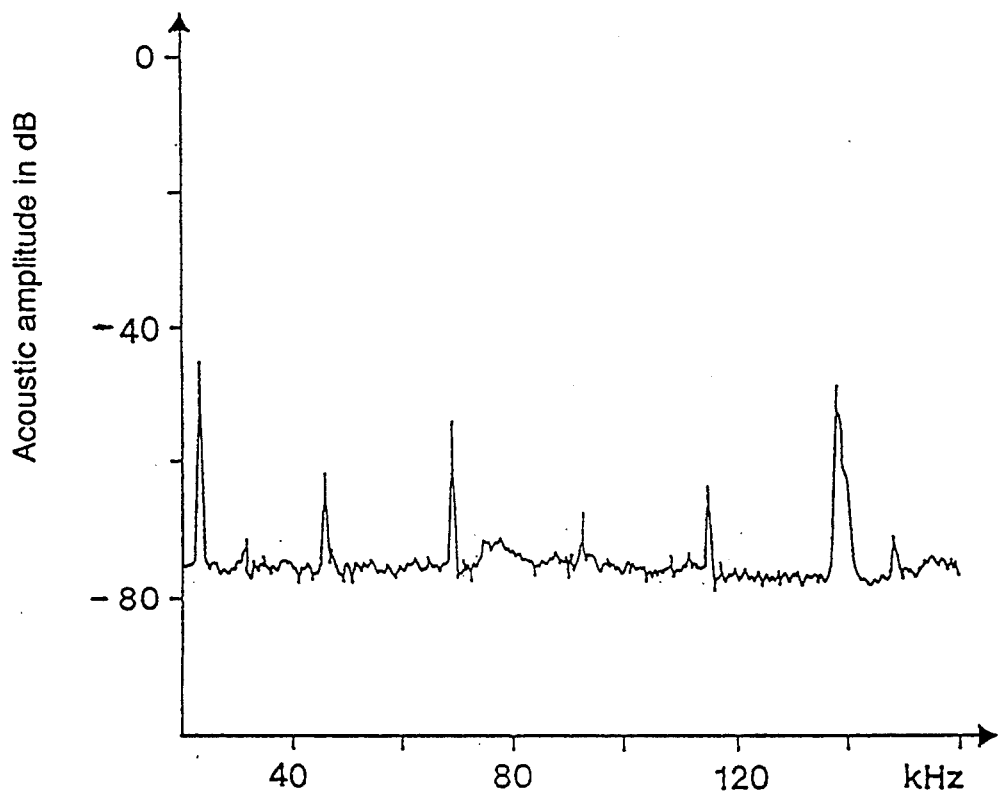
Figure 3:
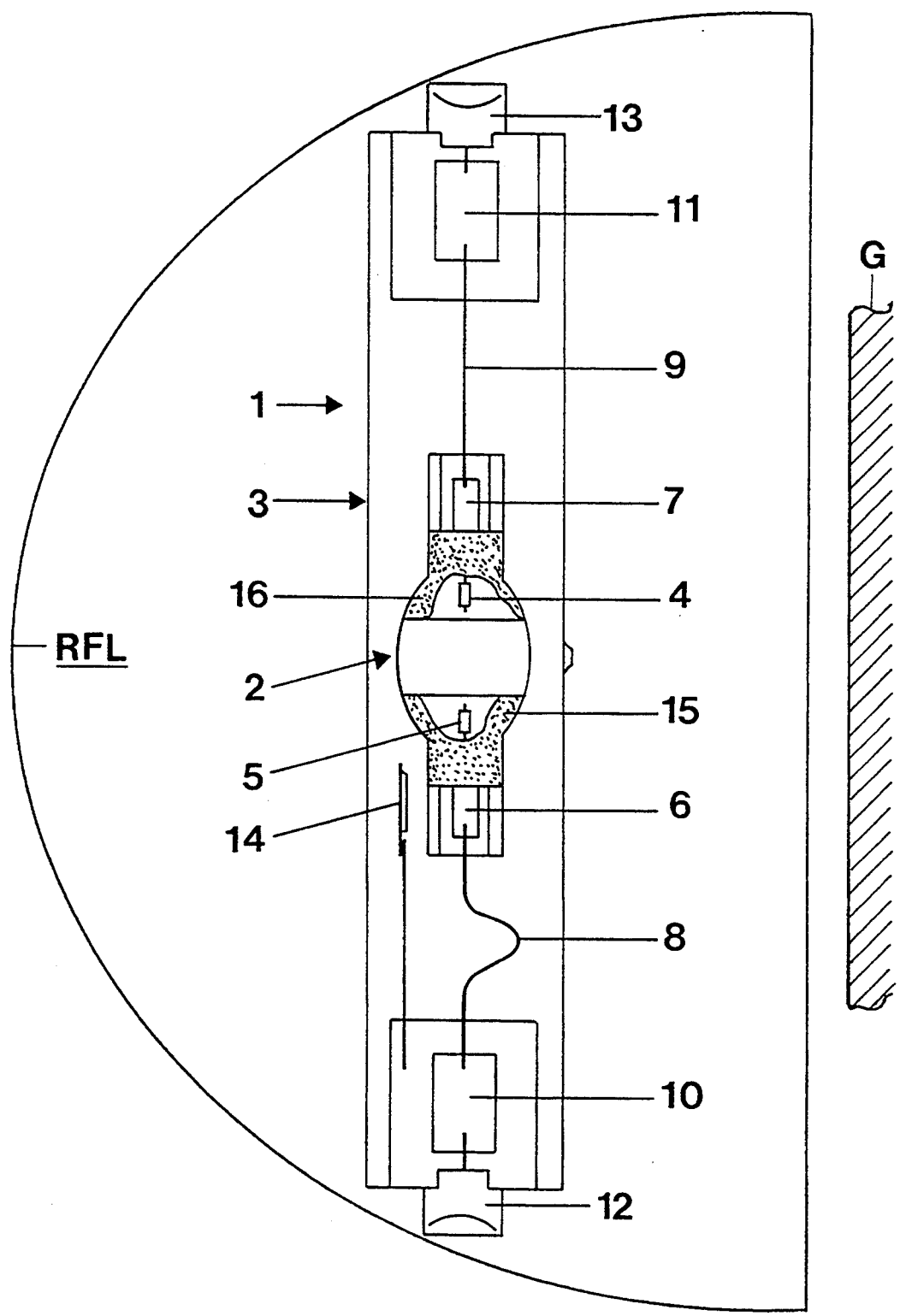
FIG. 3 is a highly schematic view of the high-pressure discharge lamp.

FIGS. 1a and 1b will be considered together; these figures show, respectively, a frequency analysis of the alternating current amplitude in FIG. 1a and of the radial acoustic resonance in FIG. 1b for a 70 W metal halide high-pressure discharge lamp, for example of the type shown in FIG. 3. The frequency of the alternating current $F_V$ which is supplied to the lamp is 22 kHz. At this operating frequency, there will be no bending of the discharge arc due to convection. The spectrum of FIG. 1a shows that harmonics occur at integer multiples of the frequency $F_V$ of 22 kHz. This is due to the non-sinusoidal, typically rectangular wave form of the alternating lamp current. Periodic variations in the discharge medium due to the instantaneous electrical energy being supplied causes the acoustic resonances. These periodic variations of the instantaneous electrical supply occur at twice the frequency of the lamp current, that is, $F_P = 2 F_V$, wherein $F_P$ reprents the frequency of the supplied lamp current.

The acoustic resonance spectrum of FIG. 1b shows that at about 69 kHz and at 138 kHz two clearly seen resonance peaks occur. Using the formula $$F_R = 3.83 \cdot c / (2\pi R) \tag{2}$$

wherein c is the propagation speed of sound in the discharge medium and R the radius of the discharge vessel, the base frequency $F_R$ of the radial acoustic resonance can be determined. Substituting data for the above referred to 70 W metal halide high-pressure discharge lamp, the following is obtained:

c = 540 m/s

R = 4.75 mm.

$F_R$ then will be 69 kHz. In other words, the defined resonances at 69 kHz and at 138 kHz in the resonance spectrum of FIG. 1b are identified as the radial acoustic base resonance and the first harmonic thereof. The radial acoustic resonance at 138 kHz is better defined and higher than the radial acoustic resonance at the base frequency of 69 kHz. This is an indication that the first acoustic harmonic at 138 kHz is excited by the fifth harmonic of the lamp current or, respectively, by the second harmonic of the instantaneous electrical power which, as seen in FIG. 1a, is at 138 kHz. Thus, for this 70 W metal halide high-pressure discharge lamp, the relationship between the base frequency $F_R$ of the radial acoustic resonance and the lowest operating frequency $F_V$, which permits a straight discharge arc, without bowing or bending, will be:

$$2 \cdot F_R = 3 \cdot (2F_V) \text{ or } 2 \cdot F_R = 3 \cdot F_P \tag{3}$$

wherein $F_P$ is the frequency of the instantaneous electrical power supply, see for example the article by E. Statnic "Zum Hochfrequenzbetrieb von Halogen-Metalldampflampen kleiner Leistung" ("High-frequency operation of metal vapor halide lamps of low power") from "Technisch-wissenschaftliche Abhandlungen der OSRAM-Gesellschaft" ("Technological-scientific papers of the OSRAM company"), Vol. 12, published by Springer, page 394 et seq.

The table below illustrates relationships between the base frequency of the radial acoustic resonance and the operating frequency, in which the discharge arc will be straight, that is, it will not be bowed or bent due to convection within the discharge vessel. The examples of Table 1 also show that these relatively simple relationships between the radial acoustic base resonance and the alternating energy supply frequency of the lamps are valid for quite different types of lamps with different power ratings, different fills, and different geometries of the discharge vessel. It has been believed that a simple theoretical model from which acoustic resonances can be predicted is not possible, see for example the referenced Davenport U.S. Pat. No. 4,170,746, col. 4, line 61 et seq.

The method in accordance with the present invention permits determination of the frequency of an alternating current or voltage supply for an auxiliary power supply unit, which will result in operation of the lamp, in horizontal position, without bending or bowing of the discharge arc.

Longitudinal acoustic resonances in the discharge vessel, that is, resonances parallel to the discharge path, are undesirable since such resonances quench or extinguish the arc. Longitudinal acoustic resonances can be avoided by suitable choice of the electrode spacing and operating frequency.

TABLE.

| Lamp type | Alternat. current frequency $F_V$ | Frequency of power supply $F_P$ | Radial acoustic resonacne frequency $F_R$ | Radius R of discharge vessel perpendicular to the discharge path |
|---|---|---|---|---|
| HQI-TS | 22 kHz | 44 kHz | 69 kHz | 4.75 mm |

TABLE.-continued

| Lamp type | Alternat. current frequency $F_V$ | Frequency of power supply $F_P$ | Radial acoustic resonacne frequency $F_R$ | Radius R of discharge vessel perpendicular to the discharge path |
| --- | --- | --- | --- | --- |
| 70 W/WDL HQI-TS | 18 kHz | 36 kHz | 54 kHz | 6.0 mm |
| 150 W/WDL HQI-TS | 17.5 kHz | 35 kHz | 51.7 kHz | 6.25 mm |
| 150 W/NDL D1 35W | 58 kHz | 116 kHz | 227 kHz | 1.5 mm |

Referring now to FIG. 3, which shows the general construction of the first three discharge lamps shown in the table.

The lamp has a double-ended pinch-sealed discharge vessel 2 which is axially located beneath an outer envelope bulb 3, secured thereto by molybdenum foils 10, 11 and held in position by suitable current supply leads 8, 9. The lamp electrodes 4, 5 are connected over molybdenum foil melt seals 6, 7 to the current supply leads 8, 9 which, through the molybdenum foils 10, 11, are then connected to external supply terminals 12, 13, secured in suitable bases. A getter 14 is located in the space between the discharge vessel 2 and the envelope bulb 3. The discharge vessel 2 is made of quartz glass and is coated, in part, with a heat-reflective coating 15, 16.

The structure of the fourth lamp shown in the table differs from that of the other three only in the absence of an outer bulb 3. The discharge vessel 2 of the lamp of FIG. 3 is bulged outwardly in drum or barrel shape in a central region thereof. The shape between the axially extending electrodes 4, 5 is rotation-symmetrical with an effectively constant radius R.

The lamp is associated with an optical system, shown schematically as reflector RF2, and oriented horizontally, as schematically shown by ground G.

The D1 lamp which is the fourth one of the table, in the region between the pinch ends with the molybdenum foils 6, 7, has essentially the shape of a rotation-symmetrical ellipsoid.

Figure 4:
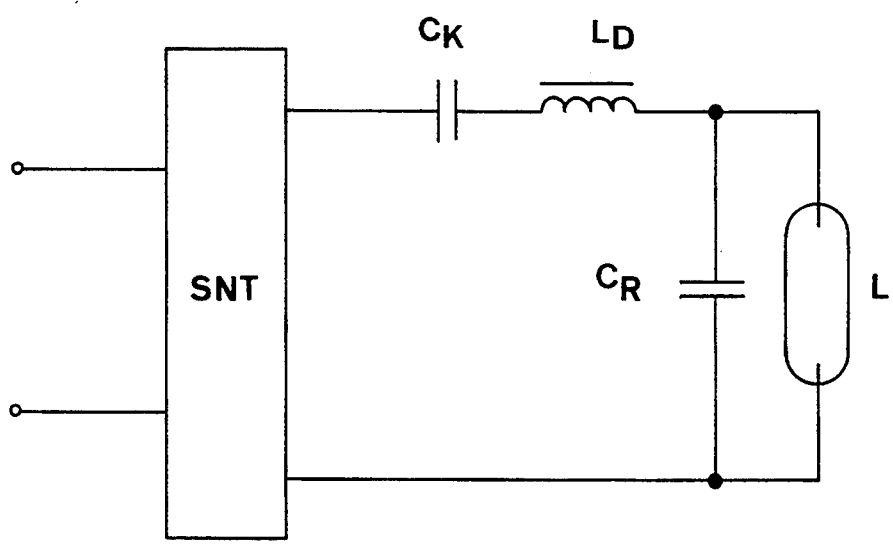
FIG. 4 is a highly schematic basic circuit diagram to operate the discharge lamp in accordance with the method of the present invention.

All four lamps shown in the table are driven by an electronic power supply. The electronic circuitry is, generally, shown in block diagram form in FIG. 4. The respective high-pressure discharge lamp L is coupled, for example integrated into a series resonance circuit formed by a coupling capacitor $C_K$, a choke $L_D$ and a resonance capacitor $C_R$. The power supply portion itself is a component SNT which, basically, is formed of an externally controlled transistor half-wave circuit, as well known; the book by C. H. Sturm/E. Klein: "Betriebsgeräte und Schaltungen für elektrische Lampen" ("Operating apparatus and circuits for electric lamps"), 6th edition, published by Siemens AG, pp. 212-215, chapter on halide metal vapor high-pressure lamps and operating apparatus, illustrates a suitable circuit. The externally controlled transistor half-bridge has high frequency stability, with a frequency variation of about ±2%.

The HQI-TS-70 W/WDL lamp listed in the table, which is the first one, is a 70 W metal halide high-pressure discharge lamp, the discharge vessel 2 of which is bulged outwardly between the electrodes 4, 5, as seen in FIG. 3, to have, centrally between the electrodes 4, 5, a radius of about 4.75 mm. The volume of the discharge vessel is approximately 0.69 cm$^3$. The discharge vessel has a fill which includes mercury, argon and halides of the metals tin, sodium, thallium, indium and lithium. The lamp is operated from the power supply circuit SNT with square-wave supply having a frequency $F_V$ of about 22 kHz at a voltage of between about 350 to 400 V. The wave form of the lamp current and of the lamp voltage are influenced by the circuit components of the series resonance circuit. It has been found by measurement that lamp current and lamp voltage are approximately in phase and that the wave form of the alternating current is similar to the charge and discharge curve of a capacitor.

Figure 2:
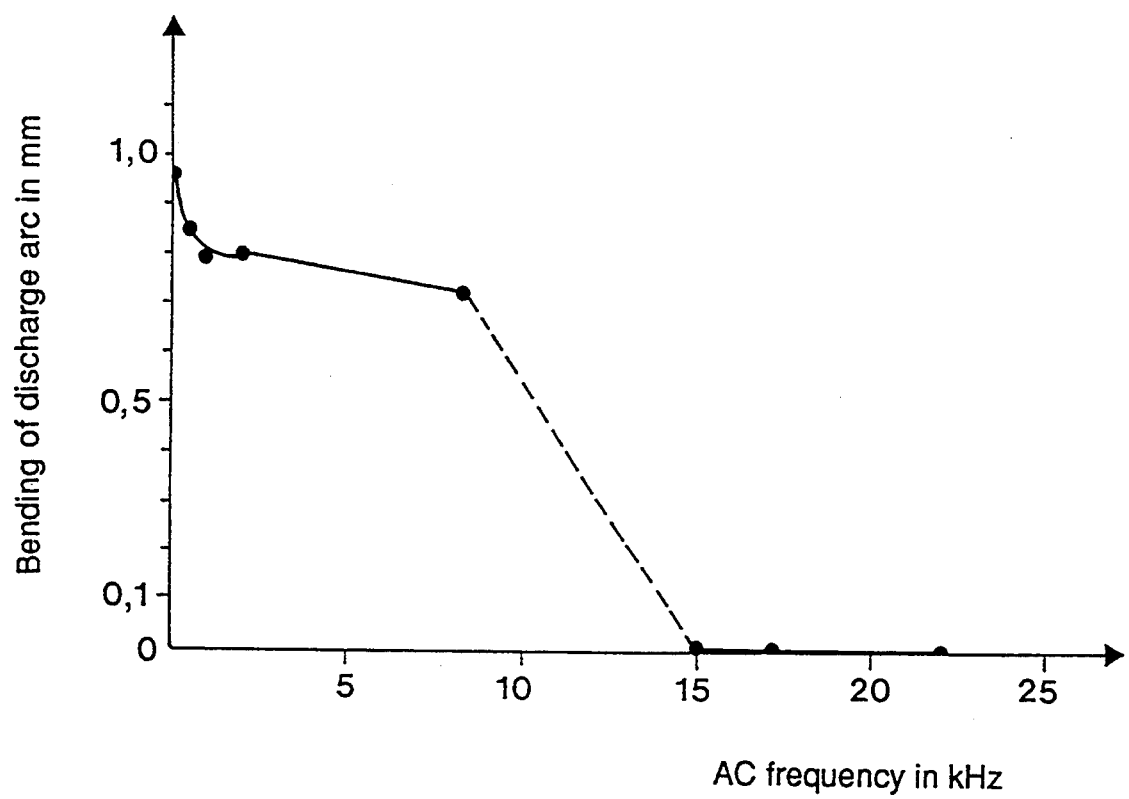
FIG. 2 is a representation of bending of the discharge arc, in millimeters (ordinate), in the center of the arc in dependence on frequency of the operating supply current for a 70 W high-pressure metal halide discharge lamp.

As seen in FIG. 2, operating the lamp with a frequency of below 8 kHz, the discharge arc will be sharply curved. In the frequency range between about 8-15 kHz, stable lamp operation is not possible. Raising the a-c supply frequency from about 15 kHz upwardly, the lamp can be operated with low bending of the discharge arc. At about 23 kHz, the deflection of the arc due to convection totally disappears from the discharge arc. The operating frequency $F_V$ of 23 kHz corresponds to an energy frequency $F_P$ of $F_P = 46$ kHz. The base frequency $F_R$ of the radial acoustic resonance, in accordance with the frequency analysis shown in FIG. 1b, and in accordance with the relationship (1) above, is at about 69 kHz. This satisfies, with good approximation, the equation (1) by substituting values, namely $3 \cdot F_P = 2 \cdot F_R$ or $6 \cdot F_V = 2 \cdot F_R$, respectively. Radial acoustic resonance phenomena will be generated in the discharge medium by operating the lamp at an a-c frequency of 23 kHz. Standing pressure waves will be generated within the discharge medium which will have pressure nodes and radially outwardly respectively alternating pressure maxima and pressure minima along the axially extending discharge path. These standing pressure waves dominate the convection in the discharge space and prevent bending of the discharge arc due to convection.

The metal halide lamp HQI-TS-150 W/WDL, the second lamp of the table, is a 150 W metal halide high-pressure discharge lamp. The discharge vessel 2 is bulged outwardly in the central region between the electrodes 4, 5, with an inner radius of about 6 mm. The volume of the discharge vessel 2 is about 1.5 cm$^3$. The fill of the lamp has the same components as the fill of the first lamp, above described. The quantities of the respective fill components, however, are different. The lamp does not show bending of the discharge arc due to convection by operating the power supply component SNT with a square-wave voltage of 18 kHz. The power frequency $F_P$ then will be 36 kHz. A frequency analysis of the radial acoustic resonance shows that the base frequency $F_R$ of the radial acoustic resonance is at about 54 kHz and the first harmonic at about 108 kHz. Again, the relationship $3 \cdot F_P = 2 \cdot F_R$ or $6 \cdot F_V = 2 \cdot F_R$, respectively, is at least approximately met, that is, the second harmonic of the instantaneous electric power and the first harmonic of the radial acoustic resonance are approximately the same.

The lamp HQI-TS-150 W/NDL, the third lamp of the table, is another 150 W metal halide high-pressure discharge lamp, having a somewhat different fill to provide a somewhat different color rendition index of the light output. The discharge vessel, in the bulged-out region between the electrodes 4, 5, has an inner radius R of about 6.25 mm. The fill contains argon, mercury, tin, and additives of halides of sodium, dysprosium, holmium, tulium and thallium. This lamp has a higher color temperature than the lamp in accordance with the second embodiment described above. Upon operation with a square-wave voltage of 17.5 kHz, no bending of the arc due to convection has been noted. The base frequency $F_R$ of the radial acoustic resonance and the first harmonic are at about 51.7 kHz and 102.5 kHz, respectively, and, again, at least approximately the relationship $3 \cdot F_P = 2 \cdot F_R$ is, approximately, valid. The acoustic resonance conditions are satisfied so that radial acoustic resonance phenomena will occur within the discharge medium.

The lamp D1 35 W, the fourth lamp in the table, is a 35 W metal halide high-pressure discharge lamp, suitable for automotive use. The discharge vessel 2 has the shape of a rotational ellipsoid between the pinched ends thereof. The inner diameter R, perpendicular to the axis of rotation, is about 1.5 mm. The power supply circuit SNT to operate the lamp uses a push-pull inverter with two transformers. A typical inverter of this type is described in the referenced book by C. H. Sturm/E. Klein: "Betriebsgeräte und Schaltungen für elektrische Lampen" ("Operating apparatus and circuits for electric lamps"), 6th edition, published by Siemens AG, pp. 212–215, chapter on halide metal vapor high-pressure lamps and operating apparatus. The power supply generates an alternating voltage of 58 kHz, resulting in lamp operation without discharge arc bending due to convection. A frequency analysis of the acoustic resonances determined a base frequency of the radial acoustic resonance of 227 kHz, corresponding to roughly double power frequency $F_P = 116$ kHz, which is just twice that of the a-c supply frequency $F_V = 58$ kHz. Thus, for the D1 lamp, the relationship $2 F_P = F_R$, which is one of the resonance conditions needed to cause radial acoustic resonances in the discharge medium, is fulfilled. The table summarizes the results for all examples given.

In addition to the standing radial acoustic waves, standing azimuthal acoustic waves, to a certain, limited extent, can straighten the discharge arc. In this case the relationship is $$2.89\ F_{RA} = 3\ F_P,$$

wherein $F_{RA}$ is the azimuthal acoustic base resonance frequency and $F_P$ is the electrical power frequency. The azimuthal base resonance frequency is calculated from the sound speed C in the discharge medium and the radius of the discharge vessel to $F_{RA} = 1.84\ C/(2\pi R)$.

We claim:

1. Method to operate a high-pressure discharge lamp, suitable for high-pressure discharge lamps which, in operation, is horizontally positioned,
    wherein the horizontal discharge lamp has a discharge vessel (2) defining an at least approximately rotation-symmetrical discharge space;
    an ionizing fill including a noble gas or mixture of noble gases, at least one metal halide additive and mercury being included within the discharge space,
    and wherein said lamp is supplied with energy having an alternating current component between 10 kHz and 100 kHz, said method comprising
    controlling the frequency and wave shape of the alternating current component to generate, within the discharge medium, standing, radial acoustic waves; and
    wherein the relationship between the frequency $F_V$ of the alternating current component and the base frequency $F_R$ of the standing acoustic radial waves have the following relationship with respect to each other:

$$n \cdot 2 F_V = m \cdot F_R \qquad (1)$$

wherein m and n are integers of 1, or 2, or 3.

2. The method of claim 1, wherein the relationship between the frequency $F_V$ of the alternating current component and the base frequency $F_R$ at least approximately meets the relationship $3 \cdot (2 F_V) = 2 \cdot F_R$ or $F_V = \frac{1}{3} F_R$, respectively.

3. The method of claim 1, wherein the relationship between the frequency $F_V$ of the alternating current component and the base frequency $F_R$ at least approximately meets the relationship $2 \cdot (2 F_V) = F_R$ or $F_V = \frac{1}{4} F_R$, respectively.

4. The method of claim 1, wherein the base frequency $F_R$ of the radial acoustic resonance is determined in accordance with the relationship $F_R = 3.83\ c/(2\pi R)$,
    wherein R is the radius of the essentially rotation-symmetrical discharge space and c is the speed of sound measured along the radius R within the discharge medium.

5. The method of claim 1, wherein the base frequency $F_R$ of the radial acoustic resonance is determined in accordance with the relationship $F_R = 3.83\ c/(2\pi R)$,
    wherein R is the radius of the essentially rotation-symmetrical discharge space and c is the speed of sound measured along the radius R within the discharge medium;
    and wherein the discharge vessel is bulged or barrel-shaped and the radius R is the maximum radius of said discharge vessel measured between electrodes within the discharge vessel.

6. The method of claim 1, wherein the current supply is in form of essentially square-wave current.

7. An illumination system comprising a high-pressure discharge lamp
    wherein the discharge lamp has a discharge vessel (2) defining an at least approximately rotation-symmetrical discharge space;
    an ionizing fill including: a noble gas or mixture of noble gasses, at least one metal halide additive and mercury being included within the discharge space,
    and wherein said lamp is supplied with energy having an alternating current component between 10 kHz and 100 kHz;
    a power supply (SNT) coupled to the discharge lamp and providing alternating current power to the lamp, and an optical system (RFL), the lamp being positioned horizontally within the optical system at a predetermined location with respect to the optical system, wherein said power supply provides power to the lamp at a frequency such that radial acoustic waves will be generated within the discharge medium and in which the frequency $F_V$ and the base frequency $F_R$ of the standing acoustic radial waves have, at least approximately, the relationship $$n \cdot 2F_V = m \cdot F_R \tag{1}$$

in which m and n are integers of 1, or 2, or 3;

and the base frequency $F_R$ of the radial acoustic resonance waves is determined in accordance with the relationship $$F_R = 3.83\ c/2\pi R$$

in which R is the radius of the essentially rotation-symmetrical discharge space and c is the speed of sound measured along the radius R within the discharge medium.

8. The system of claim 7, wherein the relationship between the frequency $F_V$ of the alternating current component and the base frequency $F_R$ at least approximately meets the relationship $3 \cdot (2F_V) = 2 \cdot F_R$ or $F_V = \frac{1}{3} F_R$, respectively.

9. The system of claim 7 wherein the relationship between the frequency $F_V$ of the alternating current component and the base frequency $F_R$ at least approximately meets the relationship $2 \cdot (2F_V) = F_R$ or $F_V = \frac{1}{4} F_R$, respectively.

* * * * *